US006670765B2

(12) United States Patent
Muto

(10) Patent No.: US 6,670,765 B2
(45) Date of Patent: Dec. 30, 2003

(54) MERCURY-FREE METAL HALIDE LAMP, WITH CONTENTS AND ELECTRIC POWER CONTROL DEPENDING ON RESISTANCE PROPERTIES

(75) Inventor: Masaaki Muto, Kawasaki (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/935,638

(22) Filed: Aug. 24, 2001

(65) Prior Publication Data

US 2003/0057876 A1 Mar. 27, 2003

(51) Int. Cl.$^{7}$ .................................................. B60Q 1/02
(52) U.S. Cl. .......................................... 315/82; 313/641
(58) Field of Search .............................. 315/82, 77, 83, 315/358, 246, 248; 313/637, 638, 643, 642, 570, 572, 641

(56) References Cited

U.S. PATENT DOCUMENTS

| | | | | |
|---|---|---|---|---|
| 4,757,236 A | | 7/1988 | Dakin et al. | 313/638 |
| 4,983,889 A | | 1/1991 | Roberts | 315/246 |
| 5,059,865 A | | 10/1991 | Bergman et al. | 315/82 |
| 5,221,876 A | | 6/1993 | Bergman et al. | 315/82 |
| 5,736,811 A | | 4/1998 | Westemeyer et al. | 313/318.02 |
| 6,069,456 A | | 5/2000 | Fromm et al. | 315/248 |
| 6,392,346 B1 | * | 5/2002 | Newell et al. | 313/637 |
| 6,483,241 B1 | * | 11/2002 | Stockwald | 131/638 |

FOREIGN PATENT DOCUMENTS

| | | |
|---|---|---|
| EP | 0 883 160 | 12/1998 |
| EP | 1 037 257 | 9/2000 |
| EP | 1 037 258 | 9/2000 |
| EP | 1 102 307 | 5/2001 |
| JP | 06-084496 | 3/1994 |
| JP | 6-111772 | 4/1994 |
| JP | 11-111219 | 4/1999 |
| JP | 11-307048 | 5/1999 |
| JP | 11-238488 | 8/1999 |
| JP | 2000-243348 | 9/2000 |

* cited by examiner

*Primary Examiner*—James Clinger
(74) *Attorney, Agent, or Firm*—Morgan, Lewis & Bockius LLP

(57) ABSTRACT

A metal halide discharge lamp can include a light emitting tube having a discharge chamber formed in the light emitting tube and containing no mercury. A pair of electrodes can be provided with a portion, which projects into the discharge chamber. The discharge chamber can include a buffer gas, which also acts as a starter gas, of xenon (Xe) in an amount of 7–20 atmospheres at room temperature, and at least one kind of metal halide. The light emitting tube can have a positive resistance range in current-voltage characteristics relative to a varying input electric power. In the positive resistance range, the light emitting tube can be driven by an electric power which is less than or equal to a rated power supplied during steady lighting. In the metal halide lamp of the invention, even if the input electric power to the light emitting tube is varied, sudden unintentional extinguishment does not occur, and varying range of light color can be narrowed.

25 Claims, 6 Drawing Sheets

MERCURY-FREE METAL HALIDE LAMP, WITH CONTENTS AND ELECTRIC POWER CONTROL DEPENDING ON RESISTANCE PROPERTIES

BACKGROUND OF THE INVENTION

1. Field of the Invention

The present invention relates to a high-intensity discharge lamp, also known as a metal halide lamp, for use in a vehicle headlamp, fog lamp etc. and other illumination devices. The invention more particularly relates to a mercury-free high intensity discharge lamp with high lumen output efficiency in the visible light wavelength, appropriate color rendering property and excellent discharge stability, enabling practical dimming of a headlight incorporating the mercury-free high intensity discharge lamp.

2. Description of the Related Art

In a conventional high-intensity discharge lamp such as a metal halide lamp, mercury has been used not only as a light emitting material, but also as a buffer gas in order to promote vaporization of other light emitting materials by increasing the temperature of a light emitting tube (arc tube) and to adjust lamp voltage of the light emitting tube. The lamp voltage can be understood as a voltage of the light emitting tube during steady lighting of the high intensity discharge lamp comprising the light emitting tube. Steady lighting is a state of lighting after a start-up or initial lighting period has finished. However, mercury is a toxic substance which has the potential to cause damage to the environment. Therefore, development of a light emitting tube which does not contain mercury is a long-felt need for manufacturers of high-intensity discharge lamps.

In another conventional metal halide lamp, a light emitting tube which comprises no mercury (referred hereinafter as "a mercury-free light emitting tube") can be made by sealing a starter gas such as xenon (Xe) gas in the light emitting tube. The amount of sealed Xe gas corresponds to a few atmospheres or more at room temperature. Room temperature means substantially a normal, comfortable temperature. Thus, metal halides on a wall of a discharge chamber of the light emitting tube are vaporized by heat transmission from a xenon arc that has a high temperature and extends towards the wall of the chamber.

In the conventional mercury-free light emitting tube, major light emitting materials are metal halides which have similar thermodynamic properties to mercury. However, the conventional mercury-free metal halide lamp has different light emitting characteristics from the conventional mercury metal halide lamp. For example, in the conventional mercury metal halide lamp, if a dimming function is operated by decreasing input electric power to the metal halide lamp, the color of light emitted from the light emitting tube greatly changes because intensity of light emitted from mercury (having relatively high vapor pressure) is maintained while emission of light from other metals (metal halides) greatly decreases. On the other hand, in the conventional mercury-free metal halide lamp, if input electric power to the metal halide lamp is decreased, the color of light emitted from the light emitting tube changes in a smaller range, because light emission from each metal decreases keeping substantially the same ratio to all metals in the discharge chamber, and light emitted from each metal collectively constitutes the light emitted from the light emitting tube. However, the conventional mercury-free metal halide lamps have problems, some of which are described later in detail with reference to Japanese Patent Publications.

In yet another conventional light emitting tube capable of instant lighting, a starter gas including Xe gas is sealed in the discharge chamber in an amount of more than a few atmospheres at room temperature. A few times the rated current is supplied in an initial lighting period just after start-up of the light emitting tube. When the light emitting tube is started up from room temperature (referred hereinafter as "cold start"), electrodes disposed in the light emitting tube are heated to temporarily reach a high temperature, which expedites deterioration of the electrodes. Further, in a light emitting tube made of silica glass, electrodes which are made of tungsten are embedded in sealed portions of the light emitting tube located adjacent the discharge chamber. In this structure, mercury and metal halides creep and stay in a gap between the electrodes and the sealed portion when the light emitting tube was cooled by turning off the light emitting tube. Such mercury and metal halides located in this gap are instantly vaporized by a steep temperature rise on cold start of the light emitting tube, which may destroy the sealed portions of the light emitting tube where the electrodes are embedded. The lifetime of this kind of light emitting tube is substantially determined by the number of times cold starts that occur rather than the lighting hours. In cases where the metal halide lamp is used in devices which are frequently and repeatedly turned on and off, the lifetime of the light emitting tube can be greatly improved if the turn-off mechanism includes a dimming mechanism, i.e., number of times turnoff is decreased by replacing it with a certain dimming operations.

Japanese Patent Publication No. 6-84496 discloses a mercury-free high pressure metal halide discharge lamp capable of dimming. According to an embodiment of the patent publication, the high pressure metal halide discharge lamp comprises NaI 20 mg, $ScI_3$ 4 mg, and Xe gas which is sealed into a discharge chamber in an amount of approximately 8 atmospheres at room temperature. Rated electric power of the high pressure metal halide discharge lamp is 150W. If the rated electric power is decreased to 75W, the light color of the lamp is maintained, and a certain level of dimming without accompanying strangeness to a viewer is achieved. Further, the lamp voltage of approximately 90V is achieved by setting the multiplication factor of Xe gas pressure (atm.) and distance between the electrodes (mm) to be greater than or equal to 40.

According to results of the inventors trial and experiments, combination of NaI and $ScI_3$ provides relatively good color rendering property and color reproducibility, i.e., color maintenance property before and after dimming, and high lumen output efficiency. However, the color of light obtained by the combination is rather greenish, and not pure white. According to testing and experiments, the light obtained did not fall within the scope of tolerance for white automobile light in the chromaticity diagram. Accordingly, usage of the high pressure metal halide lamp as a light source for illumination devices is limited depending on the required color rendering property for the illumination devices.

Lamp voltage is determined by the sum of voltage drop caused by electrodes and impedance produced by, for example, the electron scattering effect by metal atoms and produced by attachment of free halogens and electrons. Mercury greatly commits itself to areas of voltage because it has especially large collision cross section with an electron. According to the embodiment of the patent publication, no mercury is contained in the chamber of the light emitting tube. However, the light emitting tube achieved the same voltage as that of mercury-containing light emitting tubes. It is understood that vapor pressure of the metal halide was increased by operating the light emitting tube at a very high temperature. Since vapor pressure of metal halides is very high, it causes devitrification of the wall of the chamber and deterioration of electrodes due to reaction of the silica glass light emitting tube and the metal halides.

Japanese Patent Publication No. 11-238488 discloses a substantially mercury-free metal halide discharge lamp that includes a first halide with at least one metal selected from the group consisting of sodium, scandium, and a rare earth metal capable of predetermined light emission. The substantially mercury-free metal halide includes a second halide having relatively high vapor pressure and tendency of declination to emit visible light. The second halide includes at least one metal selected from the group consisting of aluminum (Al), iron (Fe), cadmium (Cd), zinc (Zn), tin (Sn), manganese (Mn), chromium (Cr), gallium (Ga), rhenium (Re), magnesium (Mg), cobalt (Co), nickel (Ni), beryllium (Be), titanium (Ti), zirconium (Zr), hafnium (Hf), and antimony (Sb). A rare gas can be sealed in a discharge chamber of the discharge lamp. The metal halide discharge lamp does not contain a substantial amount of mercury.

The second halide acts as a buffer gas, and produces the same lamp voltage as mercury. Efficiency of the lamp of the patent publication is improved by: 1) providing sufficiently high lamp voltage, which makes lamp current small, thereby preventing current capacity of the illumination devices incorporating the metal halide discharge lamp or circuit connected to the metal halide discharge lamp from increasing; and 2) reducing energy loss by electrodes. Further, it is also disclosed that a range of light color change is narrowed during dimming of the metal halide discharge lamp.

However, according to results of the inventor's testing and experiments, the second halide emits light in an ultraviolet wavelength, which does not create lumen output in a visible light wavelength. In the metal halide discharge lamp according to the patent publication, although the lamp voltage takes an approximate value to that of the metal halide discharge lamp comprising mercury, lumen output efficiency in visible light wavelength of the conventional lamp free from mercury is smaller than the conventional lamp comprising mercury.

Further, depending on the additive amount of the second halide, halogen density during lighting is excessively increased, which tends to cause unstable discharge. In a state of unstable discharge, if the current and electric power are controlled to dim the light, unintentional extinguishment of the lamp (by discharge interruption) may often occur relatively soon after start of unstable discharge. Further, shading of ultraviolet light rays caused by the addition of the second halide is required depending on its wavelength and intensity.

Regarding usage of the metal halide lamp as a light source of an automobile headlight, a day-time running lamp (referred hereinafter as "DRL") is required by regulations in some countries. The DRL provides light distribution in high-beam mode for illuminating a distant front area with smaller intensity than high-beam, while maintaining the color rendering property of light. However, a conventional metal halide lamp has not yet been used for DRL. The conventional metal halide lamp containing mercury is not able to operate dimming for light color change as described above. The conventional mercury-free type metal halide lamp has problems as described above when the dimming feature is operated.

Of course, not only when being used as a light source of an automobile headlight, but also when being used in various applications requiring to emit white light, it is preferable for the metal halide lamp to be capable of performing reliable dimming functions, i.e., adjusting light amount as required while maintaining color rendering property of the light, for efficient white light emission.

The present invention is intended to provide a high intensity discharge lamp which is substantially free from mercury and capable of providing high lumen output efficiency at visible light wavelengths and appropriate color rendering properties with superior discharge stability, enabling more practical uses for a high intensity discharge lamp with dimming function.

SUMMARY OF THE INVENTION

In order to resolve the aforementioned and other problems in the related art, the present invention can include a metal halide discharge lamp having the following characteristics. In a first aspect of the present invention, a metal halide discharge lamp comprising a light emitting tube, the light emitting tube comprising a discharge chamber formed in the light emitting tube containing no mercury, a pair of electrodes a portion of which projects into the discharge chamber, wherein the discharge chamber comprising a buffer gas, which also acting as a starter gas, of xenon (Xe) in 7–20 atmospheres at room temperature, and at least one kind of metal halide. The lamp has a positive resistance range in current-voltage characteristics relative to a varying input electric power, and in the positive resistance range, the light emitting tube is driven by an electric power which is equal to or smaller than a rated power supplied during steady state of lighting. The steady state of lighting is a state of lighting after a start-up lighting period has finished. In the steady state of lighting, the state of discharge is stable and the amount of luminous flux of the discharge lamp is stable as long as dimming operation is not performed. It is usual that rated electric power is supplied to the discharge lamp during the steady lighting period. In the metal halide lamp of the present invention, even if the input electric power to the light emitting tube is varied, flickering or sudden unintentional extinguishment does not occur, and the varying range of light color is narrowed.

In yet another aspect of the present invention, in the positive resistance range in current-voltage characteristics relative to a varying input electric power, electric power supplied to the light emitting tube is equal to or larger than 57% of the rated electric power supplied in the steady lighting period. By setting electric power to be in the above-described range, superior discharge stability which is appropriate for dimming light intensity of the headlight is provided.

In another aspect of the present invention, in the positive resistance range in current-voltage characteristics relative to a varying input electric power, total luminous flux varies in a range of 19–100% relative to luminous flux of the metal halide lamp during steady lighting. The range of total luminous flux provides a range of varying amount of light from the light emitting tube for use in the automobile headlight capable of dimming light intensity with stable discharge.

In another aspect of the present invention, in the positive resistance range in current-voltage characteristics relative to a varying input electric power, the input electric power varies in a range such that color of light emitted from the light emitting tube stays in a range of substantial white, enabling smooth dimming without accompanying great change of color rendering property which can be perceived to human eyes with strangeness. The substantial white means the following range in CIE 1931 xy chromaticity diagram.

$$x \geqq 0.345 \quad y \leqq 0.150+0.640x$$

$$x \leqq 0.405 \quad y \geqq 0.050+0.750x$$

The above range of chromaticity is consistent with a chromaticity range as specified in JEL 215 published by Nihon Denkyu Kogyo-kai for high intensity discharge lamps such as metal halide lamp of D2R type and D2S type used as a light source of an automobile headlight.

In another aspect of the present invention, the metal halides comprise at least sodium iodide (NaI) and scandium iodide ($ScI_3$), thereby high lumen output efficiency in visible light wavelength is achieved.

In yet another aspect of the present invention, mole fraction of $ScI_3$ relative to NaI is in a range of 0.10–0.43, thereby superior visible lumen output efficiency is achieved.

In still another aspect of the present invention, the metal halides further comprise indium iodide (I) in addition to NaI and $ScI_3$. Mole percent of InI relative to all metal halides is in a range of 3–12 mol %, thereby the white light emission is achieved while limiting decrease of visible lumen output efficiency to an acceptable level as automobile light.

In another aspect of the present invention, the sum of molarities of all metal halides relative to an inner volume per unit of the light emitting tube is in a range of 30–100 $\mu$mol/cc, thereby minimizing decrease of lumen output efficiency and change of chromaticity even after long lighting hours, and suppressing shading of light and unfavorable coloring to a predetermined color of emitted light by unvaporized metal halides.

In a further aspect of the present invention, in a period from start-up of the light emitting tube until it reaches steady lighting, electric power equal to or smaller than 300% of the rated power is supplied to the light emitting tube, thereby instant start-up of the light emitting tube is possible.

In another aspect of the present invention, the rated electric power of the light emitting tube is 35W, and lamp voltage of light emitting tube just after start-up is in a range of 15–25V. Further, lamp voltage of light emitting tube in steady lighting is in a range of 30–50V. In the above-determined range of electric power, the metal halide discharge lamp provides optimized electric property for use in an automobile headlight.

In another aspect of the present invention, the metal halide discharge lamp can be driven by direct current.

In yet another aspect of the present invention, wherein the light emitting tube has a range where impedance of the light emitting tube is equal to or smaller than 75Ω in current-voltage characteristics relative to a varying input electric power, and the light emitting tube is driven during steady lighting by an electric power which is equal to or smaller than the rated power. Mole fraction of $ScI_3$ relative to NaI is in a range of 0.05–0.43, thereby superior visible lumen output efficiency is achieved.

In another aspect of the present invention, the rated electric power of the light emitting tube is in a range of 10–50W, thereby size of the light emitting tube, which is appropriate for both instant start-up and the dimming operation, is determined.

In a still further aspect of the present invention, lamp voltage of the light emitting tube with rated electric power in the range of 10–50W is in a range of 20–65V in steady lighting, thereby appropriate voltage and current for dimming operation of the light emitting tube is obtained. Electric power supplied to the light emitting tube during steady lighting varies in a range of approximately 40–100% of the rated electric power during steady lighting, thereby discharge without unintentional extinguishment during the dimming operation can be achieved.

DETAILED DESCRIPTION OF THE PREFERRED EMBODIMENTS

Figure 1:
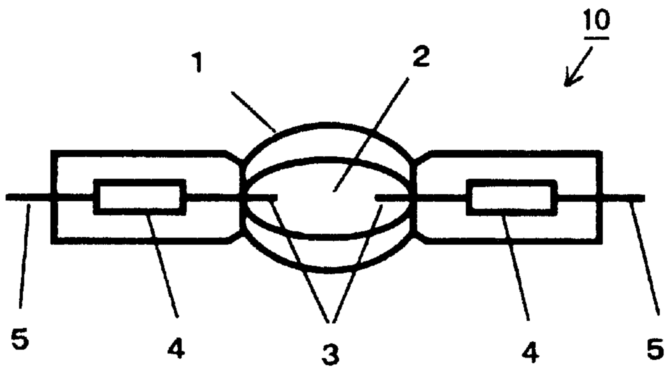
FIG. 1 is a schematic view of a metal halide lamp according to a preferred embodiment of the present invention.

Detailed description of the present invention will now be given based on embodiments shown in the drawings. Whenever possible, the same reference numbers are used throughout the drawings to refer to the same or like parts.

FIG. 1 shows a metal halide discharge lamp 10 that includes a light emitting tube 1' according to a preferred embodiment of the present invention. In the present invention, light emitting tubes similar to that shown in FIG. 1 were used throughout the testing and experiments conducted by the inventor, as long as not specified otherwise. The light emitting tube 1 can be made of silica glass and can include a discharge chamber 2 formed inside. The inner volume of the discharge chamber is preferably approximately $28.0\times10^{-3}$ cc. A pair of electrodes 3 made of a high melting point material such as tungsten can be embedded in the light emitting tube 1 such that one end of each electrode projects into the discharge chamber 2. A metal foil 4 and a lead wire 5 can be arranged to be adjacent each electrode 3. Metal foils 4 made of molybdenum, etc. can be respectively connected by welding, etc to the corresponding electrode 3 on the side of discharge chamber 2, and can also be connected to the corresponding lead wire 5 at a location spaced from the discharge chamber 2. A portion of the electrodes 3 can be air-tightly embedded into the silica glass of the light emitting tube 1 by pinch-sealing, etc, to ensure electric transmittance to the electrodes 3. The lead wires 5 can be connected to a metallic end of the lamp 10 disposed in a socket and an electric power supply circuit (not shown), and provide electric power to the metal foils 4 and electrodes 3. Each of the pair of electrodes 3 can be made of the same material with the same dimensions. The electric power supply is typically alternating current supplied to the light emitting tube 1.

The discharge chamber 2 can include at least one metal halide and a buffer gas that also acts as a starter gas such as xenon (Xe) in an amount of 7–20 atm. at room temperature. At the start of discharge, an arc having high temperature is formed by Xe gas. Luminous flux emitted by Xe amounts to more than 25% of rated luminous flux.

In the metal halide lamp 10 with rated electric power of 35W for use in automobiles, rated luminous flux required by regulations in Europe and Japan is 3200 lm with a tolerance of plus or minus 450 lm. By regulation, 25% of the rated luminous flux is required to be realized within 1 second from start-up of the light emitting tube 1 when used as an automobile headlight. Luminous flux generated just after start of discharge depends on sealing pressure of Xe gas. If the sealing pressure of Xe gas is smaller than 7 atm. at room temperature, it is impossible to reach 25% of the rated luminous flux within 1 second of startup. If the sealing pressure of Xe gas is larger than 20 atm. at room temperature, a pressure within the discharge chamber 2 during lighting is over 120 atm, which does not allow for a sufficient safety factor relative to approximately 240 atm. of the allowable pressure limit for the light emitting tube. In the embodiments of the present invention, the light emitting tube 1 can preferably comprise at least sodium iodide (NaI) and scandium iodide ($ScI_3$).

Figure 2:
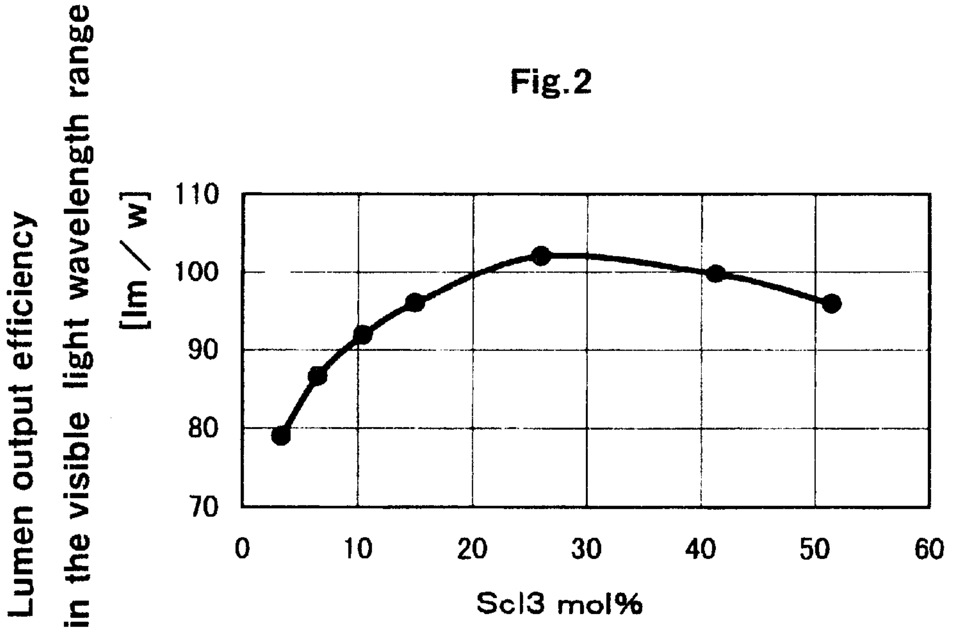
FIG. 2 is a graph showing lumen output efficiency in visible light wavelength for a light emitting tube with rated electric power of 35W and containing NaI and $ScI_3$ totaling 0.4 mg, as a function of mole percent of $ScI_3$ relative to all metal halides in the light emitting tube.

FIG. 2 shows lumen output efficiency in visible light wavelength of a light emitting tube 1 with rated electric power of 35W and which includes NaI and $ScI_3$ totaling 0.4 mg, as a function of $ScI_3$ (mol %) relative to all metal halides sealed in the discharge chamber 2. Generally, a lamp having an efficiency of greater than or equal to 80 lm/W is considered to have high lumen output efficiency. As shown in FIG. 2, the combination of NaI and $ScI_3$ provides high lumen output efficiency in the visible light wavelength range over a wide range of $ScI_3$ ratio (mol %). Visible lumen output efficiency exceeds 80 lm/W when the $ScI_3$ is more than approximately 5 mol %, with a peak at approximately 30 mol %. It is understood that, in a range of $ScI_3$ which shows increasing lumen output efficiency in visible light wavelength, the amount of formation of a halide compound, sodium scandium iodide ($NaScI_4$), having high vapor pressure is increased by the increased amount of $ScI_3$. It is also understood that, in a range of $ScI_3$ which shows decreasing lumen output efficiency in visible light wavelength, increasing the vapor pressure of the metal halides promotes reactions with the silica glass of the light emitting tube, and increases the pressure of free iodine. The free iodine attaches to electrons, thereby decreasing the degree of electrolytic dissociation of arc plasma such that light emission is declined.

In a range of FIG. 2 where lumen output efficiency in visible light wavelength is decreased as the ratio of scandium iodine ($ScI_3$) increases, it is understood that the formation of free iodine is actively performed. This is unfavorable with respect to the lifetime of the light emitting tube 1. Accordingly, for the purpose of obtaining lumen output efficiency greater than or equal to 80 lm/W for the metal halide lamp 1 in visible light wavelength, the preferred ratio of $ScI_3$ relative to all metal halides sealed in the discharge chamber 2 consisting of NaI and $ScI_3$ is in a range of approximately 5–30 mol %. In other words, mole faction of $ScI_3$ relative to NaI is in a range of approximately 0.05–0.43 in a case only $ScI_3$ and NaI are contained in the light emitting tube 1.

In a specific case where the metal halides sealed in the discharge chamber 2 comprise at least one other material such as indium iodide (InI) for light color compensation in addition to NaI and $ScI_3$, since InI decreases lumen output efficiency of the metal halide lamp 1, it is preferable to set the ratio of $ScI_3$ relative to the sum of NaI and $ScI_3$ sealed in the discharge chamber 2 in a range of 10–30 mol % in order to obtain lumen output efficiency which is equal to or more than 80 lm/W of the metal halide lamp 1 including the at least one other material. In other words, mole fraction of $ScI_3$ relative to NaI is preferably in a range of 0.10–0.43 in case $ScI_3$, NaI and the at least one other material is contained in the light emitting tube 1.

In a conventional light emitting tube, it is common to set ratio of $ScI_3$ relative to all metal halides sealed in a discharge chamber 2 comprising NaI and $ScI_3$ to be smaller than 10 mol %. If the ratio of $ScI_3$ is increased to be equal to or more than approximately 10 mol %, discharge becomes unstable due to increased free iodine partial pressure causing unstable discharge such that flickering or unintentional extinguishment of discharge is inclined to occur. In the metal halide lamp 10 of the present invention, impedance of the light emitting tube 1 can be controlled to be small, which is described in detail later. Therefore, the current flowing in the light emitting tube 1 can be larger than in the conventional light emitting tube, and electron density in the light emitting tube 1 can also be relatively large. Accordingly, although the ratio of $ScI_3$ relative to all metal halides is set to be large, discharge is very stable in the light emitting tube 1. A preferred light emitting tube 1 of the present invention comprises NaI, $ScI_3$ and more preferably also indium iodide (InI).

Figure 3:
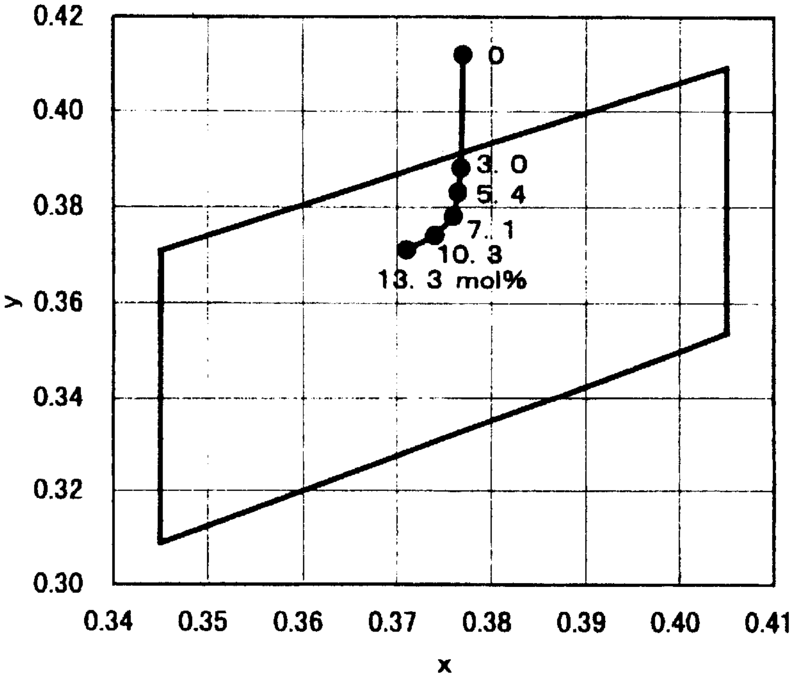
FIG. 3 is a graph showing chromaticity change for a light emitting tube including InI in addition to NaI and $ScI_3$ with a rated electric power of 35W depending on the additive amount of InI.

FIG. 3 shows chromaticity change of light emitted from a light emitting tube 1 that has a rated electric power of 35W and includes InI in addition to NaI and $ScI_3$ according to another preferred embodiment of the present invention. The total amount of all metal halides sealed in the discharge chamber 2 is 0.4 mg for samples evaluated regarding FIG. 3. The mole fraction of $ScI_3$ relative to NaI is preferably 0.35. The numbers in FIG. 3 show a mole percent (mol %) of InI relative to all metal halides in the discharge chamber 2. The area surrounded by solid lines indicates a tolerance area of white color specified by JEL 215 for a high intensity discharge lamp used as a light source in an automobile headlight. When the ratio of InI is equal to or larger than approximately 3 mol %, light emitted from the light emitting tube 1 falls within the tolerance of white color. When the ratio of InI is in a range of approximately mol 0–3%, the light emitted from the light emitting tube 1 is not able to be used as white light for an automobile headlight, but the light can be used for other applications such as a streetlight, or a light source for liquid crystal projector devices, etc.

Figure 4:
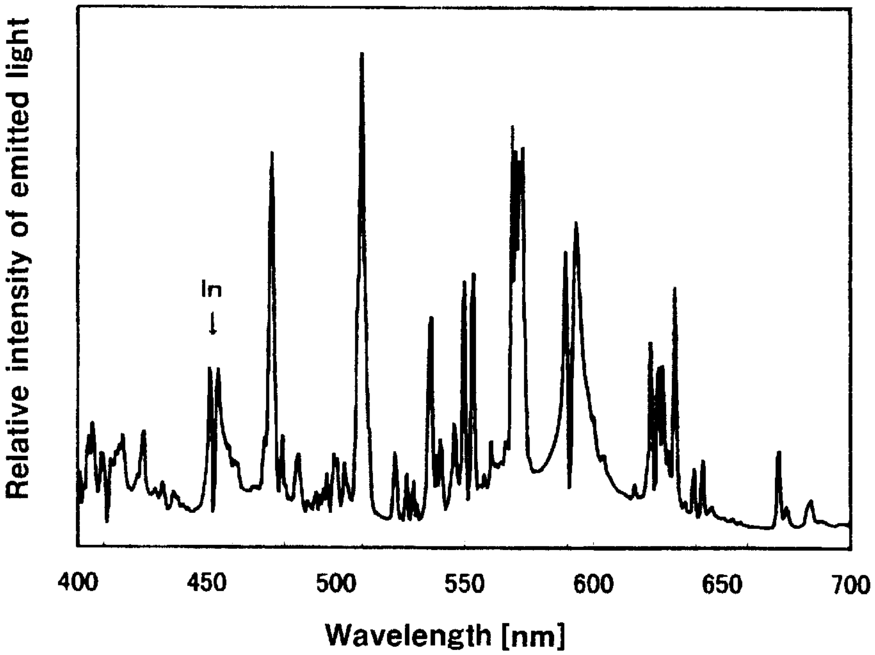
FIG. 4 shows spectrum distribution of a light emitting tube having InI which is added at a ratio of 10.3 mol % relative to all metal halides in the light emitting tube of FIG. 3.

FIG. 4 shows the spectrum distribution of light emitted from the light emitting tube 1 when the amount of InI is 10.3 mol %. Indium emits a continuous spectrum with a center wavelength of approximately 451 nm. Therefore, indium light emission is in the blue range, which tends towards shortage due to the lack of mercury in the conventional mercury-free metal halide discharge lamp. In the light emitting tube 1, since indium emits blue light, a superior white light emission from the light emitting tube 1 is achieved.

Figure 5:
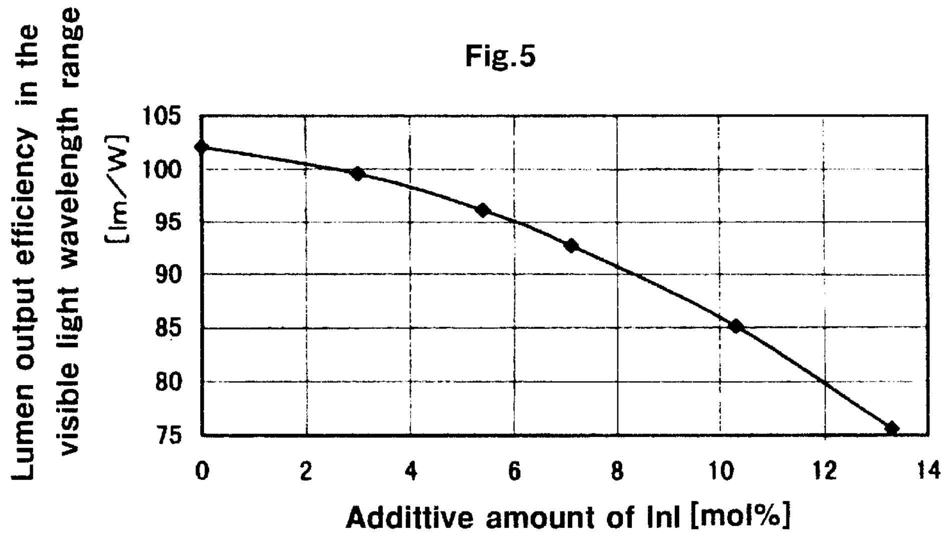
FIG. 5 is a graph showing lumen output efficiency in visible light wavelength as a function of an additive amount of InI in the metal halide discharge lamp of FIG. 3.

FIG. 5 shows the relationship of lumen output efficiency in visible light wavelength and the ratio of indium iodide (InI) which is added in the light emitting tube 1 according to the embodiment of the invention of FIG. 3. By adding InI to the metal halide sealed in the discharge chamber 2, lumen output efficiency in visible light wavelength is remarkably decreased. In order to achieve high lumen output efficiency greater than or equal to 80 lm/W, the additional amount of InI is limited to less than or equal to 12 mol %.

Accordingly, in order to satisfy both white light emission having required chromaticity for an automobile headlight and high lumen output efficiency, the added amount of InI is preferably in a range of approximately 3–12 mol %.

Total molarity of all metal halides, which is determined by inner volume per unit in the light emitting tube, is preferably greater than or equal to 30 μmol/cc, considering loss of metal halides by chemical reaction etc. during lighting. Further, in order to suppress shading and unfavorable coloring of the emitted light by metal halides which are unvaporized and stay on the wall of the discharge chamber 2, total molarity of all metal halides in the discharge chamber 2 is preferably less than or equal to 100 μmol/cc.

Figure 6:
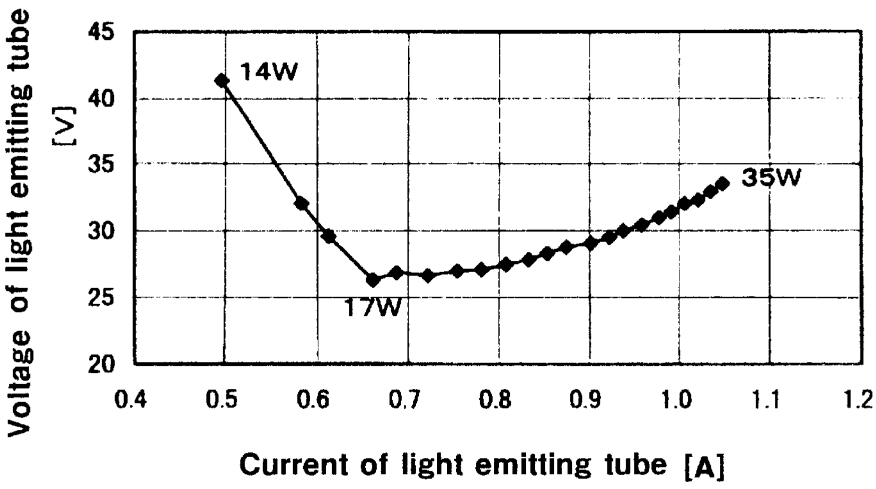
FIG. 6 is a graph showing current-voltage properties of the metal halide discharge lamp of FIG. 4.

The metal halide lamp 10 can be connected to and driven by an electric power supply that is capable of adjusting output electric power. FIG. 6 shows current-voltage characteristics when the electric power supplied to the light emitting tube 1 is decreased from the rated electric power. The interval among each measured point is approximately 1 W. The rated electric power of the light emitting tube 1 is 35W. The light emitting tube used comprises NaI, $ScI_3$ and InI. The mole fraction of $ScI_3$ relative to NaI is 0.35, and the mole percent of InI relative to all metal halides is 10.3 mol %. The inner volume of the light emitting tube 1 is $28.0 \times 10^{-3}$ cc. Total molarity of all metal halides in the discharge chamber 2 is 2.01 μmol. Molarity of metal halides at the inner volume per unit is 71.8 μmol/cc. The light emitting tube 1 further comprises Xe gas sealed in an amount corresponding to 10 atm. at room temperature.

The rated electric power at 35W supplied to the light emitting tube 1 is voltage 33.5V and current 1.05A. From these values, the electric power supplied to the light emitting tube 1 is decreased by controlling the current. As the power approaches 17W, positive resistance property appears, and lamp voltage of the light emitting tube 1 decreases as current of the light emitting tube 1 decreases. When the electric power is further decreased from 17W, the negative resistance property appears, and the lamp voltage of the light emitting tube 1 increases as current of the light emitting tube 1 decreases. In the negative resistance range, the current-voltage characteristics may exhibit unstable discharge such as flickering, and finally the lamp 1 may be unintentionally extinguished. This tendency is emphasized as the input electric power is decreased.

As a result of various testing and experiments by the inventor, it was found that, in the range where positive resistance property appears in voltage-current property, discharge is sufficiently stable and problems do not occur when accompanied by decreasing electric power. However, in the range where negative resistance property appears in voltage-current property, discharge tends to become unstable due to the steep rise of impedance of the light emitting tube 1. A diverging point between the positive resistance property and negative resistance property exists at approximately 40–50% of input electric power relative to the rated electric power of the light emitting tube with a rated electric power of 10–50W. Further, it is also found that, generally, an unintentional extinguishment is likely to occur if the impedance of the light emitting tube 1 is larger than 75 Ω.

The impedance of the light emitting tube 1 of the present invention preferably does not include a substantial amount of reactance. Therefore, the impedance can be understood as pure resistance. In a case where the metal halides other than NaI and $ScI_3$ are sealed in the discharge chamber 2, if any material which shows positive resistance property in a specified range of voltage-current property is selected as one of the metal halides sealed in the discharge chamber 2, such a light emitting tube can exhibit substantially the same property as the light emitting tube 1 of FIG. 4.

Figure 7:
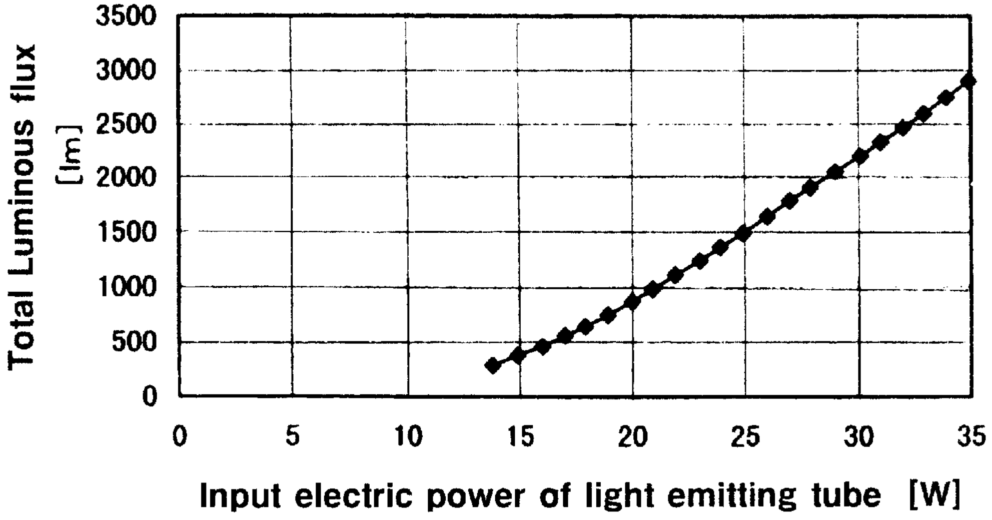
FIG. 7 is a graph showing the relationship of total lumen output and input electric power supplied to the light emitting tube of FIG. 4.

FIG. 7 illustrates the relationship of total luminous flux and the input electric power to the light emitting tube 1 of FIG. 4. As the input electric power decreases, the total luminous flux of the light emitting tube 1 decreases substantially linearly. In the range of stable discharge where the positive resistance property is observed, the minimum value of the total luminous flux can be approximately 550 lm, which is approximately 19% of the total luminous flux at the rated input electric power. As a result of various testing and experiments by the inventor, it was found that, the minimum value of luminous flux that can be decreased while maintaining discharge without unintentional extinguishment is approximately 15% of the rated luminous flux. Accordingly, it was confirmed that the light emitting tube 1 has sufficient practical dimming ability.

Figure 8:
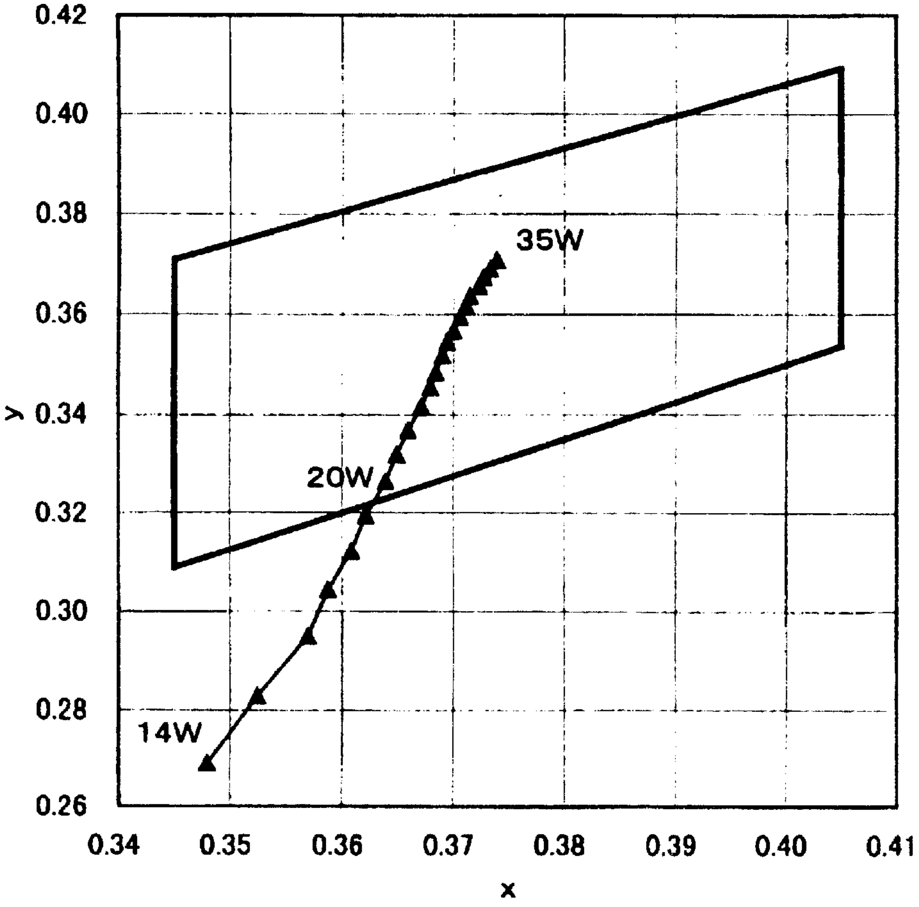
FIG. 8 is a diagram showing chromaticity change in light emitted from the light emitting tube of FIG. 4 when electric power supplied to the light emitting tube is decreased from the rated electric power of 35W.

FIG. 8 illustrates the chromaticity change of light color emitted from the light emitting tube 1 of FIG. 4 when input electric power to the light emitting tube 1 is decreased from the rated electric power of 35W. The light emitting tube does not fall within the tolerance area of white automobile headlight light on the x-y chromaticity diagram at any part of the range of input electric power showing the positive resistance property in current-voltage property. However, when the range of input electric power is decreased to about 20W which is approximately 57% of rated electric power, the light emitting tube 1 is able to emit white light in the tolerance area of chromaticity. Accordingly, when dimming the light, the light emitting tube is able to maintain light color at substantially white by setting the range of input electric power to the light emitting tube 1 to be greater than or equal 20W.

The metal halide discharge lamp according the present invention is applicable for various usage. In a case where the light emitting tube 1 is used as a light source of an automobile headlight, instant start-up is required for the light emitting tube 1. The instant light up can be achieved by setting the input electric power of the light emitting tube 1 to be larger than the rated electric power during the period from start-up to the start of steady lighting.

Generally, a metal halide discharge lamp for use in an automobile headlight is required to have a lumen start-up property of 25% of the rated luminous flux within one second and 80% of the rated luminous flux within four seconds from the start-up of the metal halide discharge lamp. In order to achieve the instant start-up property, the initial input electric power supplied to the metal halide discharge lamp can be larger than the rated electric power. As the larger initial input electric power is supplied, better lumen start-up properties are obtained. However, the larger input electric power may cause damage to the electrodes. The appropriate value of initial input electric power for superior lumen start-up property without causing excessive damage to electrodes may be determined through testing and experimentation. In the conventional metal halide discharge lamp comprising mercury, the input electric power to the light emitting tube is increased to be nearly 200% of the rated electric power at cold start. In the conventional mercury-free metal halide discharge lamp where mercury (which greatly commits to lumen startup) is not included, it takes approximately 6 seconds to reach 80% of the rated luminous flux in the same start-up conditions as the mercury-containing metal halide discharge lamp. This problem is solved in the light emitting tube 1 of the present invention, for example, by increasing the input electric power to the light emitting tube 1 to be 300% of the rated electric power at a maximum.

Figure 11:
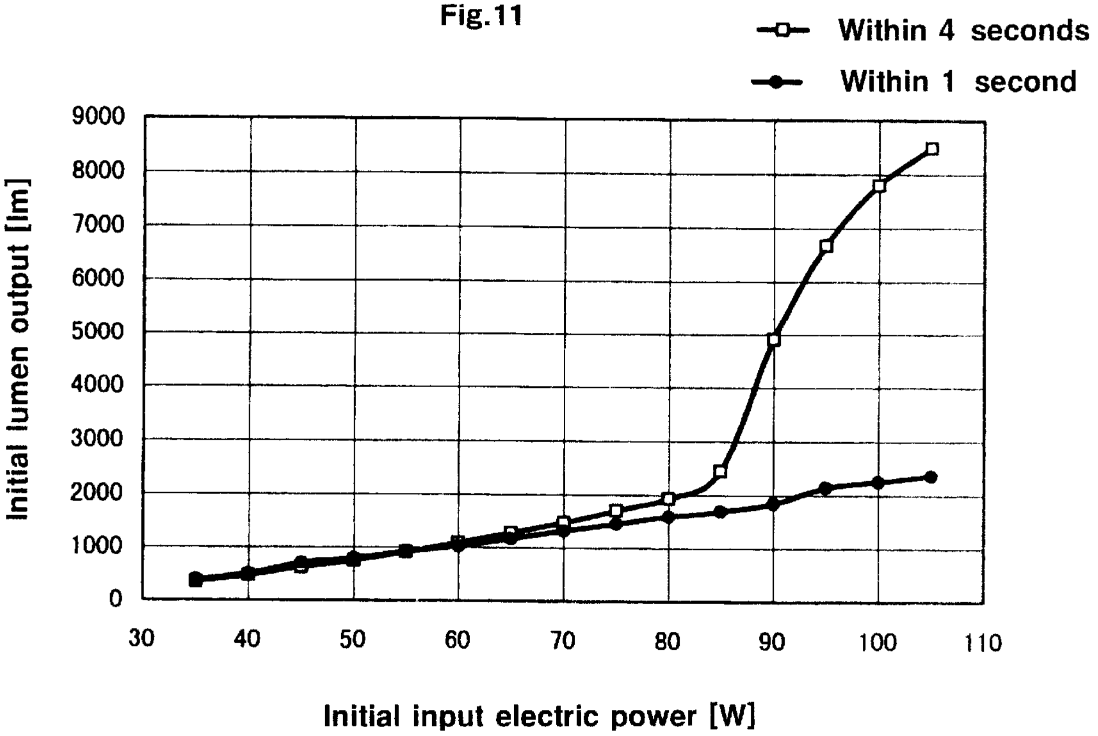
FIG. 11 shows lumen start-up properties of the light emitting tube of FIG. 4 depending on varying initial input electric power.

FIG. 11 shows the lumen start-up properties of the light emitting tube 1 of FIG. 4 as they change due to varying the initial input electric power. A line comprising circular dots shows the lumen output one-second after the start-up of the light emitting tube 1. A line comprising square dots shows the lumen output during the first four seconds after the start-up of the light emitting tube 1. When the initial input electric power to the light emitting tube 1 is greater than or equal to 90W, the luminous flux within four seconds of start-up sufficiently exceeds 80% of the rated luminous flux. When the initial input electric power to the light emitting tube 1 is approximately 90W or greater, which is approximately 250% of the rated electric power, luminous flux within one second of start-up sufficiently exceeds 25% of the rated luminous flux. When the initial input electric power exceeds 105W, which is approximately 300% of the rated electric power, the electrodes 3 may become damaged.

In the mercury-free metal halide discharge lamp with a rated electric power of 35W according to the present invention, the lamp voltage of the light emitting tube 1 can be approximately 15–25V just after start-up of the light emitting tube 1. The vapor pressure of metal halides increases as temperature of the light emitting tube 1 increases. The lamp voltage of the light emitting tube 1 becomes approximately 30–50V in steady lighting conditions. When the lamp voltage of the light emitting tube 1 becomes approximately 30–50V in steady lighting, discharge is stable even when the amount of the input electric power to the light emitting tube 1 is decreased for dimming operation. Therefore, superior dimming can be accomplished. By detecting voltage of the light emitting tube 1, it is able to reduce the input electric power as the lamp voltage of the light emitting tube 1 increases such that instant start-up of the light emitting tube 1 can be achieved without imposing an excessive load to the light emitting tube 1.

Further, both the instant start-up and the dimming can be realized by adopting an electric power supply capable of varying the electric power in a range of 40–300% relative to the rated electric power of the light emitting tube 1. When the light emitting tube 1 of FIG. 4 is used as a light source of an automobile headlight, the electric power supplied to the light emitting tube 1 can preferably vary in a range of approximately 57–300% relative to the rated electric power of the light emitting tube 1 for both the instant start-up and the dimming.

The light emitting tube 1 according to the present invention is not only used in a metal halide lamp 10 with the rated electric power of 35W, but is also-appropriate for being designed to have a relatively small size considering the acceptable pressure limits to the light emitting tube. The light emitting tube 1 is especially suitable as a lamp designed to have a structure of FIG. 1 and to be driven by the rated electric power of 10–50W. Generally, in a mercury-fee metal halide light emitting tube, if the rated electric power of the light emitting tube increases, the current flowing in the light emitting tube increases while the voltage of the light emitting tube does not change very much. As a result, exhaustion of the electrodes of the light emitting tube is promoted, and the lifetime of the light emitting tube 1 shortens. If larger electrodes are used as a preventive means against exhaustion of electrodes, the heat loss by the electrodes is increased, and the efficiency of the light emitting tube is decreased. Further, larger electrodes make it difficult to manufacture the light emitting tube. On the other hand, if the rated electric power is smaller than 10W, the heat transmission loss by the light emitting tube becomes relatively large due to a larger heat radiation area relative to a predetermined heat amount, and the lumen output efficiency in visible light wavelength of the light emitting tube 1 is decreased. Accordingly, if the light emitting tube 1, according to the present invention, is used as a lamp with the rated electric power of 10–50W, the rated current is preferably approximately 0.5–1.5A. Further, with the electrodes each having a relatively small diameter of approximately 0.10–0.60 mm, the light emitting tube has superior lifetime properties.

Figure 9:
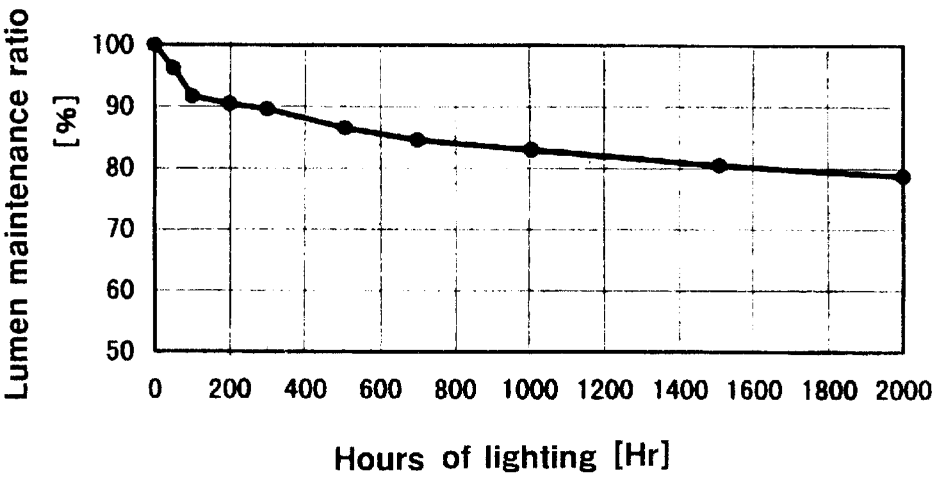
FIG. 9 is a graph showing lumen maintenance properties of the light emitting tube of FIG. 4 with rated electric power of 35W.

FIG. 9 illustrates the lumen maintenance property of the light emitting tube 1 with the rated electric power of 35W according to the second preferred embodiment of the present invention. The mercury-free metal halide discharge lamp according to the present invention has a superior lumen maintenance property over the conventional metal halide discharge lamp containing mercury. In the conventional metal halide discharge lamp containing mercury, the lumen maintenance property decreases to 60–70% after 2000 hours of lighting.

Figure 10:
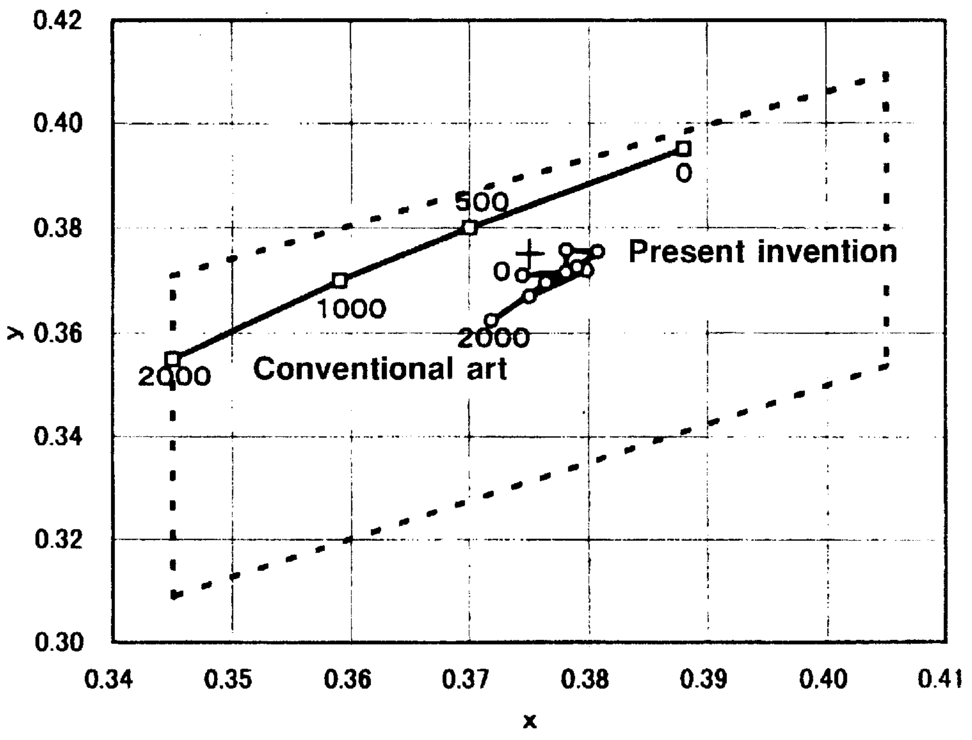
FIG. 10 is a diagram showing chromaticity change for light emitted from the 35W light emitting tube of FIG. 4, in comparison with chromaticity change of light emitted from a conventional mercury-containing 35W automobile headlight light emitting tube.

FIG. 10 is a chromaticity diagram showing the change of light color emitted from a mercury-free light emitting tube 1 of FIG. 3 with the rated electric power of 35W as lighting hour passes, in comparison with that of a conventional mercury-containing light emitting tube. The area surrounded by dotted lines is the tolerance area of white color specified in JEL 215 by Nihon Denkyu Kogyo-kai for a high intensity discharge lamp used as a light source for an automobile headlight. The numbers in the diagram show lighting hours.

In the conventional mercury-containing discharge lamp, the light color shifts to bluish white as lighting hours pass. This occurs because the light emission from the mercury gradually becomes predominant as the metal halides sealed in the discharge chamber are consumed by chemical reactions. On the other hand, in the mercury-free light emitting tube 1 of the present invention, since each metal halide sealed in the discharge chamber 2 can be consumed at the same rate as lighting hours pass, chromaticity may not substantially change. The chromaticity point marked by "+" is an objective or best chromaticity point defined by JEL215. It is clearly shown by FIG. 10 that the light emitting tube 1 according to the present invention has excellent chromaticity properties.

In a metal halide discharge lamp with rated electric power of 10–50W according to the present invention, the lamp voltage of the light emitting tube 1 during steady lighting is preferably in a range of 20–65V. The lowest voltage of the light emitting tube 1 is determined depending on the voltage drop by electrodes, which is approximately 15–20V regardless of size of the light emitting tube 1. Therefore, if the lamp voltage of the light emitting tube 1 is smaller than 20V, it is not able to obtain the voltage corresponding to the vapor pressure of metal halides, and sufficient luminous intensity cannot be obtained. If the voltage of the light emitting tube 1 is larger than 65V, the impedance of the light emitting tube 1 becomes larger than 75Ω. If current of the light emitting tube 1 is controlled to decrease when the impedance is larger than 75Ω, the discharge is inclined to be unstable to an extent that such a light emitting tube 1 is not appropriate for use as a light source and highly likely to bring about unintentional extinguishment of the light emitting tube 1.

The metal halide tamp according to the present invention can be driven by alternating current or direct current. In a case the metal halide lamp is driven by direct current, the electrodes are preferably designed to perform optimally as anodes and cathodes. For example, the cathode can be made of a tungsten (W) compound including thorium oxide ($ThO_2$) to facilitate electron emission. Preferably, the cathode is made to be a relatively small size to ensure appropriate temperature rise. The anode can be formed to have a diameter which is 2–4 times larger than that of the cathode because the temperature of the anode is inclined to increase due to incidence of electron beams. The material of the anode is preferably pure tungsten.

Driving the conventional mercury metal halide lamp by direct current brings about color separation of light emitted from the metal halide lamp, because metal sealed in the form of metal halide tends to emit light at the side of cathode rather than anode, and at the anode side, mercury emits white light which is close to blue. In the metal halide lamp according to the present invention, since the light emitting tube 1 preferably does not include mercury, white light can be emitted at all parts of the discharge arc. This characteristic is advantageous; and therefore, the light emitting tube is incorporated in various optical application devices. A switching device can be used as the output circuit in a case where the light emitting tube is driven by an electron stabilizer (ballast) using alternating current, however, the switching device is not required in a case where the light emitting tube is driven by direct current. This simplification cost leads to cost reduction.

The metal halide lamp 10 according to the present invention is applicable for various usage, and is not limited to usage as a light source of an automobile headlight. Further, in the above embodiment, the light emitting tube 1 is formed of silica glass. However, the material is not limited to silica glass, and other material such as ceramics can be used.

The operational advantages of the present invention will now be described. The metal halide lamp according to the present invention preferably contains no mercury, which is a toxic substance which can result in harmful effects to the environment. Although no mercury may be present, the metal halide lamp of the present invention has a lumen output efficiency in the visible light wavelength, and a lumen maintenance property, at approximately the same or higher level as the conventional metal halide lamps. The metal halide lamp of the present invention has excellent chromaticity maintenance properties both when the dimming operation is performed and the lighting hours have passed. Furthermore, the metal halide lamp of the present invention has superior discharge stability such that illumination devices incorporating the metal halide lamp of the present invention are able to perform the practical dimming function. In addition, the metal halide lamp of the present invention can be used as a light source for an automobile headlight, for use as a DRL, and many other applications because of its instant start-up property and its practical dimming function. Of course, the metal halide lamp of the present invention can be used without dimming.

It will be apparent to those skilled in the art that various changes and modifications can be made without departing from the spirit and scope of the invention. Thus, it is intended that the present invention cover the modifications and variations of the invention provided they come within the scope of the appended claims and their equivalents.

What is claimed is:

1. A metal halide discharge lamp having a rated power and including a light emitting tube, the light emitting tube having a discharge chamber formed in the light emitting tube containing no mercury, and a pair of electrodes having a portion projecting into the discharge chamber, the metal halide discharge lamp comprising:

a buffer gas which also acts as a starter gas located in the discharge chamber, the buffer gas including xenon (Xe) at 7–20 atmospheres at room temperature and at least one metal halide; and the light emitting tube has a positive resistance range in current-voltage characteristics relative to a varying input electric power to the light emitting tube, wherein, when in the positive resistance range, the light emitting tube is configured to provide steady lighting when driven by an electric power which is less than or equal to the rated power of the lamp.

2. The metal halide lamp according to claim 1, wherein when in the positive resistance range, the light emitting tube is configured to provide steady lighting when driven by an electric power that varies in the range of 57–100% of the rated electric power.

3. The metal halide lamp according to claim 1, wherein the discharge chamber includes at least sodium iodide and scandium iodide, and mole fraction of $ScI_3$ relative to NaI is in a range of 0.05–0.43.

4. The metal halide lamp according to claim 1, wherein the metal halide includes at least sodium iodide, scandium iodide and another metal halide, and mole fraction of $ScI_3$ relative to NaI is in a range of 0.10–0.43, and mole percent of the other metal halide relative to all metal halides is in a range of 3–12 mol %.

5. The metal halide lamp, according to claim 4, wherein the other metal halide is indium iodide.

6. The metal halide lamp according to claim 1, wherein a sum of molarities of all metal halides relative to an inner volume of the light emitting tube is in a range of 30–100 μmol/cc.

7. The metal halide lamp according to claim 1, wherein in a period from start-up of the light emitting tube to reaching steady lighting, the light emitting tube is configured to receive electric power less than or equal to 300% of the rated power.

8. The metal halide lamp according to claim 1, wherein the rated electric power of the light emitting tube is 35W, and lamp voltage of the light emitting tube just after start-up is in a range of 15–25V, and lamp voltage of the light emitting tube during steady lighting is in a range of 30–50V.

9. The metal halide lamp according to claim 8, wherein the lamp has a rated luminous flux, and when the lamp is in the positive resistance range, total luminous flux varies in a range of 19–100% relative to the rated luminous flux.

10. The metal halide lamp according to claim 1, wherein, in the positive resistance range, the light emitting tube is configured such that when input electric power varies in a predetermined range, color of light emitted from the light emitting tube maintains substantial white in the following range in CIE 1931 xy chromaticity diagram:

$$x \geqq 0.345 \quad y \leqq 0.150+0.640x$$

$$x \leqq 0.405 \quad y \geqq 0.050+0.750x.$$

11. The metal halide lamp according to claim 1, wherein the lamp is driven by direct current.

12. A metal halide discharge lamp, comprising:

a light emitting tube containing no mercury and having a rated electric power, the light emitting tube having a discharge chamber and a pair of electrodes, a portion of the electrodes projecting into the discharge chamber; and a buffer gas, which also acting as a starter gas, of xenon (Xe) at 7–20 atmospheres at room temperature, and at least one kind of metal halide, located in the discharge chamber, wherein the light emitting tube has an impedance range less than or equal to 75Ω in current-voltage characteristics relative to a varying input electric power, and the light emitting tube is configured such that, when in the range where impedance of the light emitting tube is less than or equal to 75Ω, an electric power which is less than or equal to the rated power produces steady lighting.

13. The metal halide lamp according to claim 12, wherein when in the range where impedance of the light emitting tube is less than or equal to 75Ω, electric power supplied to the light emitting tube that varies in a range of approximately 40–100% of the rated electric power produces steady lighting.

14. The metal halide lamp according to claim 13, wherein the lamp has a rated luminous flux, and when the lamp is in the range where impedance of the light emitting tube is less than or equal to 75Ω in current-voltage characteristics relative to a varying input electric power, total luminous flux varies in a range of 15–100% relative to the rated luminous flux.

15. The metal halide lamp according to claim 12, wherein the at least one kind of metal halide is sealed in the discharge chamber and includes at least sodium iodide (NaI) and scandium iodide ($ScI_3$).

16. The metal halide lamp according to claim 15, wherein mole fraction of $ScI_3$ relative to NaI is in a range of 0.05–0.43.

17. The metal halide lamp according to claim 15, wherein the at least one metal halide further includes another metal halide, wherein mole fraction of $ScI_3$ relative to NaI is in a range of 0.10–0.43, and mole percent of the other metal halide relative to all metal halides is in a range of 3–12 mol %.

18. The metal halide lamp according to claim 17, wherein the other metal halide is indium iodide.

19. The metal halide lamp according to claim 12, wherein a sum of molarities of all metal halides relative to an inner volume of the light emitting tube is in a range of 30–100 μmol/cc.

20. The metal halide lamp according to claim 12, wherein the light emitting tube is configured to receive, in a time period from start-up of the light emitting tube to reaching steady lighting, electric power less than or equal to 300% of the rated power.

21. The metal halide lamp according to claim 12, wherein the rated electric power of the light emitting tube is in a range of 10–50W, and voltage of the light emitting tube at steady lighting is in a range of 20–65V.

22. The metal halide lamp according to claim 12, wherein the lamp is driven by direct current.

23. A method for operating a discharge lamp, comprising:

providing a light emitting tube that has a rated power, a discharge chamber, and an electrode located in the discharge chamber;

providing a buffer gas located in the discharge chamber, the buffer gas including xenon (Xe) at 7–20 atmospheres at room temperature and at least one metal halide;

placing the light emitting tube in a range where impedance is less than or equal to 75Ω relative to varying input electric power; and driving the light emitting tube at less than or equal to the rated electric power to produce steady lighting.

24. The method for operating a discharge lamp of claim 23, wherein the step of driving includes driving the light emitting tube at a range of approximately 40–100% of the rated electric power.

25. The method for operating a discharge lamp of claim 23, wherein the step of placing the light emitting tube in a range where impedance is less than or equal to 75Ω relative to varying input electric power includes placing the light emitting tube in a positive resistance range relative to a varying input electric power.

* * * * *